US011394460B2

(12) United States Patent
Schneider

(10) Patent No.: US 11,394,460 B2
(45) Date of Patent: Jul. 19, 2022

(54) OPTICAL TRANSMISSION/RECEPTION UNIT AND APPARATUS FOR SIGNAL TRANSFER

(71) Applicant: Fraunhofer-Gesellschaft zur Förderung der angewandten Forschung e.V., Munich (DE)

(72) Inventor: Tobias Schneider, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/064,499

(22) Filed: Oct. 6, 2020

(65) Prior Publication Data

US 2021/0021341 A1     Jan. 21, 2021

Related U.S. Application Data

(63) Continuation of application No. PCT/EP2019/058821, filed on Apr. 8, 2019.

(30) Foreign Application Priority Data

Apr. 12, 2018  (DE) ................... 10 2018 205 559.9

(51) Int. Cl.
*H04B 10/40*     (2013.01)
*H04B 10/112*    (2013.01)
(Continued)

(52) U.S. Cl.
CPC ....... *H04B 10/1123* (2013.01); *H04B 10/071* (2013.01); *H04B 10/25137* (2013.01);
(Continued)

(58) Field of Classification Search
CPC ............. H04B 10/1123; H04B 10/071; H04B 10/614; H04B 10/25137; H04B 10/11;
(Continued)

(56) References Cited

U.S. PATENT DOCUMENTS 4,401,360 A   8/1983  Streckmann et al.
5,790,291 A   8/1998  Britz
(Continued)

FOREIGN PATENT DOCUMENTS

DE    102014225097 A1   6/2016
EP        0683574 A1   11/1995
WO     2016028226 A1    2/2016

OTHER PUBLICATIONS

Jens Thoms Törring, "Wie funktioniert eine Linse?", Sonnentaler, Berlin, Jul. 28, 2008 (with machine translation).

*Primary Examiner* — Dibson J Sanchez
(74) *Attorney, Agent, or Firm* — Perkins Coie LLP; Michael A. Glenn

(57) ABSTRACT

An optical transmission/reception unit includes a carrier rotatable about a rotational axis, an optical receiver arranged at the carrier on the rotational axis to receive an optical reception signal from a first direction, an optical transmitter arranged adjacent to the optical receiver at the carrier to emit an optical transmission signal in a second direction, and a transmission/reception optic arranged at the carrier on the rotational axis above the optical receiver and extending across the optical receiver and the optical transmitter, wherein the transmission/reception optic includes a reception optic and a transmission optic arranged in the reception optic. The reception optic is configured to guide the optical reception signal incident on the transmission/reception optic towards the optical receiver on the rotational axis, and the transmission optic is arranged above the optical transmitter and is configured to shape the optical transmission signal emitted by the optical transmitter into an output beam.

17 Claims, 8 Drawing Sheets

(51) Int. Cl.
  *H04B 10/071* (2013.01)
  *H04B 10/2513* (2013.01)
  *H04B 10/61* (2013.01)
  *H04B 10/11* (2013.01)
  *G02B 6/42* (2006.01)
  *G02B 6/36* (2006.01)
  *H04B 10/114* (2013.01)

(52) U.S. Cl.
  CPC ......... *H04B 10/614* (2013.01); *G02B 6/3604* (2013.01); *G02B 6/4246* (2013.01); *H04B 10/11* (2013.01); *H04B 10/1143* (2013.01); *H04B 10/40* (2013.01)

(58) Field of Classification Search
  CPC .. H04B 10/1143; H04B 10/40; H04B 10/803; G02B 6/3604; G02B 6/4246
  USPC .................................. 398/118–131, 135–139
  See application file for complete search history.

(56) References Cited

U.S. PATENT DOCUMENTS

| | | | |
|---|---|---|---|
| 5,825,792 A * | 10/1998 | Villeneuve | H01S 3/137 372/32 |
| 5,828,146 A * | 10/1998 | Lorenz | G02B 6/3604 310/68 D |
| 5,946,118 A * | 8/1999 | Flaherty | H04L 12/413 398/58 |
| 6,353,693 B1 | 3/2002 | Kano et al. | |
| 6,434,293 B1 * | 8/2002 | Igeta | G02B 6/3604 385/25 |
| 10,164,717 B2 * | 12/2018 | Kakimoto | H04B 10/11 |
| 10,516,490 B2 * | 12/2019 | Sundaram | H04B 10/40 |
| 2002/0141011 A1 * | 10/2002 | Green | H04B 10/1125 398/127 |
| 2003/0053769 A1 * | 3/2003 | Schunk | G02B 6/4246 385/93 |
| 2004/0240885 A1 * | 12/2004 | Naoe | H04B 10/118 398/118 |
| 2005/0031350 A1 * | 2/2005 | Haber | H04B 10/1127 398/128 |
| 2005/0129407 A1 * | 6/2005 | Coleman | H04B 10/1123 398/130 |
| 2007/0140620 A1 * | 6/2007 | Schorpp | G02B 6/3604 385/47 |
| 2008/0069495 A1 * | 3/2008 | Hirohashi | H04B 10/801 385/25 |
| 2011/0058817 A1 * | 3/2011 | Kuo | H04B 10/803 398/130 |
| 2012/0057818 A1 | 3/2012 | Zeiger et al. | |
| 2012/0275795 A1 * | 11/2012 | Chan | H04B 10/116 398/128 |
| 2013/0236183 A1 * | 9/2013 | Chao | H04B 10/116 398/101 |
| 2017/0244490 A1 * | 8/2017 | Hallal | H04B 10/80 |
| 2019/0305847 A1 * | 10/2019 | Sharp | H04B 10/11 |
| 2020/0336210 A1 * | 10/2020 | Khatibzadeh | H04B 10/112 |

\* cited by examiner

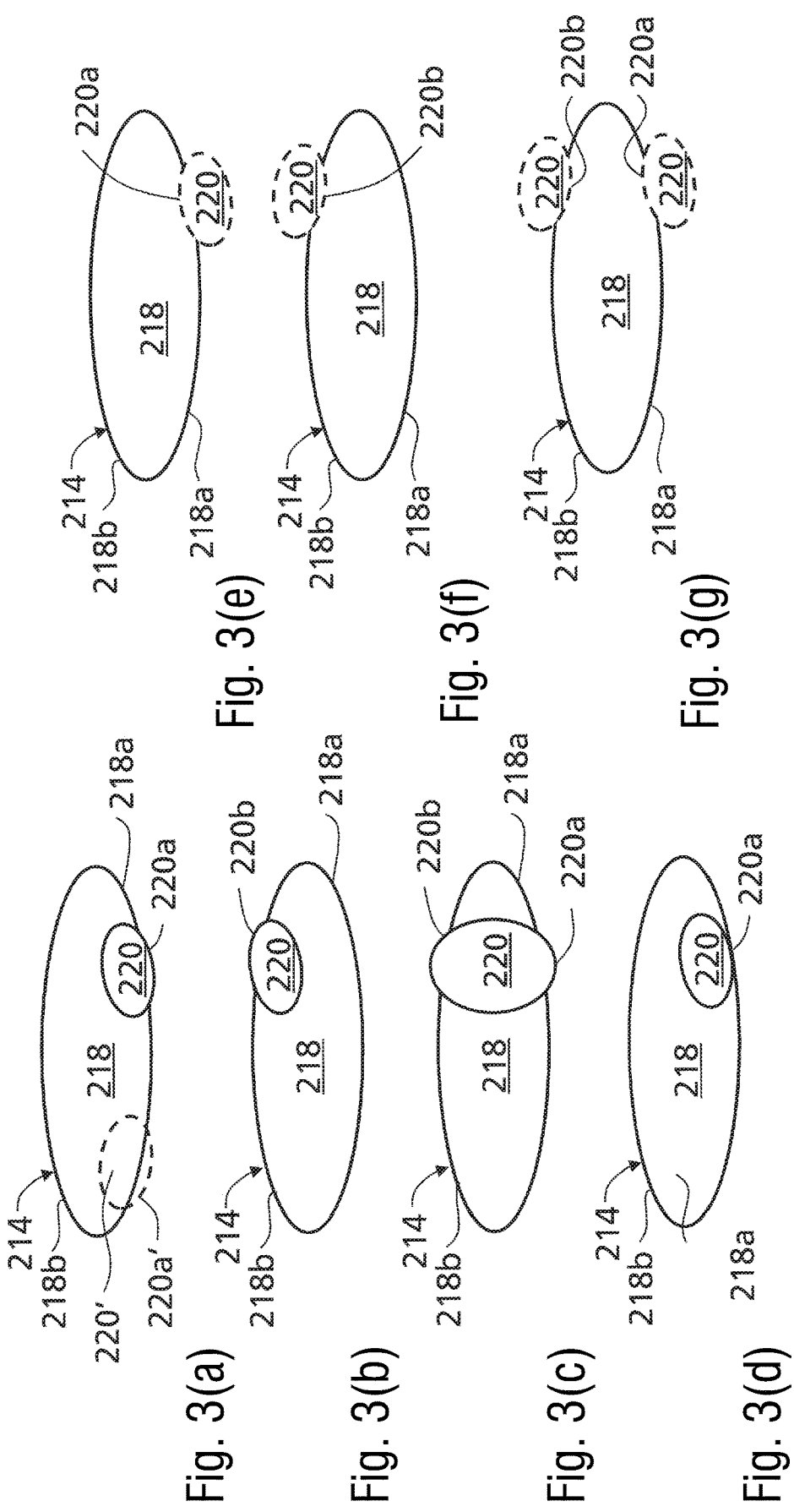

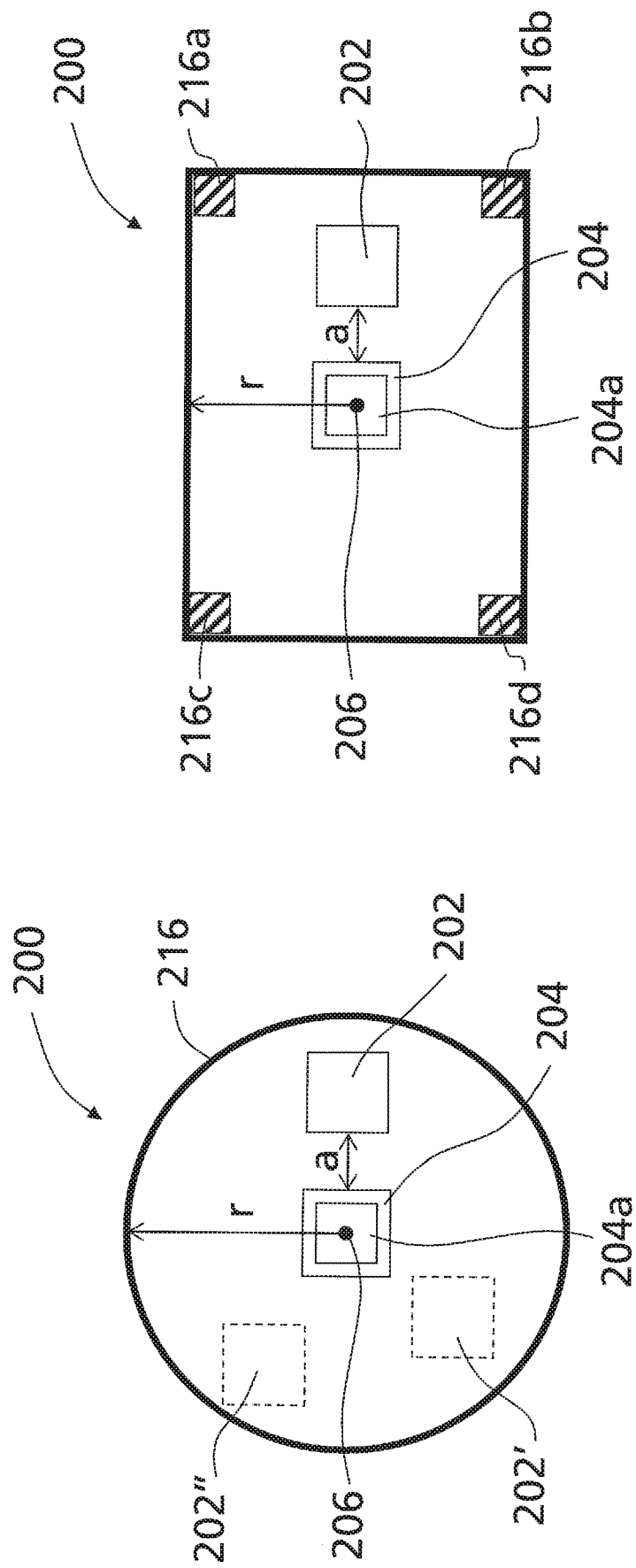

OPTICAL TRANSMISSION/RECEPTION UNIT AND APPARATUS FOR SIGNAL TRANSFER

CROSS-REFERENCES TO RELATED APPLICATIONS

This application is a continuation of copending International Application No. PCT/EP2019/058821, filed Apr. 9, 2019, which is incorporated herein by reference in its entirety, and additionally claims priority from German Application No. DE 10 2018 205 559.9, filed Apr. 12, 2018, which is incorporated herein by reference in its entirety.

BACKGROUND OF THE INVENTION

The present invention relates to the field of signal transfer, in particular to the optical data transfer via two components that are arranged to be rotatable with respect to each other. Embodiments concern an optical transmission/reception unit, in particular a rotatable optical short haul transmission/reception unit for optical wireless data transfer using a special optical design.

In the conventional technology, different approaches for enabling a signal transfer are known, e.g. data transfer between two components that are arranged to be rotatable with respect to each other. Either both components are supported to be rotatable, or one of the components is arranged to be rotatable relative to the other one. Conventional approaches solve the problems of data transfer via two components that rotate with respect to each other by using cables, wherein slip rings or contact brushes are used at the rotation position to transfer the electric signals. Such contact-based signal transfer approaches are of disadvantage since the contact-based transfer technique, in particular due to the wear of the contacts, reduces, or limits, the service life of the rotation position and therefore also the service life of the overall system. In addition, the omnidirectional signal propagation of the electric signal on the slip ring causes a multi-path propagation that can lead to run-time differences of the individual electric signals, which may cause a limitation of the transfer bandwidth.

Other conventional technology approaches for avoiding the disadvantages of contact-based transfer techniques in the signal transfer via a rotation position employ an optical wireless data transfer using optical transmission/reception units or transceivers that are provided in the components arranged to be rotatable relative to each other. This optical approach has the advantage of them operating without wear and therefore not limiting the service life of the overall system. The above-mentioned multi-path propagation of the signal is also avoided so that a limitation of the transfer bandwidth is avoided with such optical wireless data transfer systems, making it possible to achieve high data rates, e.g. 100 Mbit/s and more.

FIG. 1 shows a schematic illustration of a conventional signal transfer apparatus including two optical wireless transmission/reception units, wherein FIG. 1(a) illustrates an orientation of the two optical transmission/reception units with an intact data connection, or an intact data link, between them, and FIG. 1(b) illustrates the two transmission/reception units being rotated with respect to each other so that the data connection is interrupted.

FIG. 1(a) shows a first transmission/reception means 100a comprising an optical transmitter 102a and an optical receiver 104a. In addition, FIG. 1(a) illustrates a rotational axis 106 about which the first transmission/reception unit 100a is rotatable. The optical transmitter 102a and the optical receiver 104a are arranged spaced apart from the rotational axis 106 in the transmission/reception unit 100a. For the optical data transfer, the optical transmitter 102a generates a first transmission beam 108a directed towards a second transmission/reception unit 100b. In turn, the second transmission/reception unit includes an optical transmitter 102b and an optical receiver 104b arranged on both sides of the rotational axis 106. The second transmission/reception unit is arranged to be rotatable about the rotational axis 106, as is indicated by the arrow 106b. In the example illustrated in FIG. 1(a), the two transmission/reception units 100a, 100b are orientated in such a way with respect to each other that the optical transmitter 102a in the first transmission/reception unit 100a is opposite to the optical receiver 104b in the second transmission/reception unit 102b, and that the optical transmitter 102b of the second transmission/reception unit 100b is opposite to the optical receiver 104a of the first transmission/reception unit 100a. The transmission beams 108a and 108b transmitted by the optical transmitters 102a and 102b, respectively, are directed to the opposite optical receivers 104b and 104a, respectively. When orientating the two transmission/reception units 100a, 100b according to the illustration in FIG. 1(a), a bidirectional data transfer or, if using only one of the optical transmitters, a unidirectional data transfer is possible. In other words, the data connection between the two transmission/reception units 100a, 100b is intact.

The disadvantage of the conventional apparatus for the optical wireless data transfer via a rotation position based on FIG. 1(a) consists in the fact that the corresponding transmitter/receiver of the two rotatable, or relatively rotatable, transmission/reception units have to be orientated with respect to each other, so that, in other words, the transmitter and the receiver are in visual contact with each other. However, if there is a relative rotation of the transmission/reception units 100a, 100b out of the position illustrated in FIG. 1(a), e.g. when rotating the first transmission/reception unit 100a about 180° with respect to the second transmission/reception unit 100b, e.g. as is illustrated in FIG. 1(b), the transmitter and the receiver are no longer opposite to each other. Rather, as can be seen, the corresponding transmitters and the corresponding receivers are opposite to each other in the two transmission/reception units 100a, 100b. In other words, there is no longer a visual contact between the transmitter and the receiver in the two opposite transmission/reception units, or the visual contact is lost, so that the data connection is interrupted.

SUMMARY

According to an embodiment, an optical transmission/reception unit may have: a carrier rotatable about a rotational axis, an optical receiver arranged at the carrier on the rotational axis so as to receive an optical reception signal out of a first direction, an optical transmitter arranged adjacent to the optical receiver at the carrier so as to emit an optical transmission signal in a second direction, and a transmission/reception optic arranged at the carrier on the rotational axis above the optical receiver and extending across the optical receiver and the optical transmitter, wherein the transmission/reception optic has a reception optic and a transmission optic arranged in the reception optic, wherein the reception optic is configured to guide the optical reception signal incident on the transmission/reception optic towards the optical receiver on the rotational axis, and wherein the transmission optic is arranged above the optical transmitter and is configured to shape the optical transmission signal emitted by the optical transmitter into an output beam.

According to another embodiment, an apparatus for signal transfer may have at least one first optical transmission/reception unit according to the invention and at least one second optical transmission/reception unit according to the invention; wherein the first and the second optical transmission/reception unit are arranged in such a way with respect to each other that a transmission beam of a transmission/reception unit illuminates the reception optic of an opposite transmission/reception unit.

According to the invention, it has been recognized that the problem of data interruption in a conventional signal transfer apparatus including two optical wireless transmission/reception units occurs in particular if the distance d between the two transmission/reception units or transceivers is in the range of the transceiver size, e.g. if the distance is smaller than a radius of the transmission/reception units. For example, such short dimensions of the distance d are used in applications in which a data connection is to be provided between printed circuit boards (PCBs), or in the use of the apparatus of FIG. 1 as an optical slip ring replacement on rotating machinery parts. In other words, the short distance of the transmission/reception units leads to the transmission beam emitted by the corresponding optical transmitters not expanding sufficiently to reach the corresponding receiver of the opposite transmission/reception unit in case of a relative rotation of the transmission/reception units, resulting in the situation illustrated in FIG. 1(b), which, with a relative rotation of the components having the corresponding transmission/reception units 100a, 100b arranged thereon, may lead to interruptions of the data transfer, i.e. a continuous data connection between the two components is not ensured by means of the conventional apparatus shown in FIG. 1.

The present invention is based on the finding that the above-discussed problem in conventional rotatable optical short haul transceivers for the optical wireless data transfer lies in the arrangement of the optical transmitter and/or the optical receiver. In transmission/reception units as explained on the basis of FIG. 1, the optical transmitter includes a light source, and the radiation profile of the transmission beam is shaped by a transmission optic. For example, the optical receiver includes a photo diode having associated thereto its own reception optic so as to collect the received transmission beam, i.e. the received light signal. These two fundamental parts of the rotatable optical short haul transceiver are arranged side by side, as explained on the basis of FIG. 1, so that the rotational axis extends between the two units, i.e. between the transmitter and the receiver. As explained above, this design leads to the fact that, with a distance between the two transceivers that is short when compared to the size of the transceiver, a relative rotation of the elements is not possible at all or only to a small extent, since a large relative rotation of the two transceivers leads to an interruption of the transfer because the transmitter and the receiver in the corresponding transceivers no longer see each other.

In order to solve this problem, the present invention proposes a design of an optical transmission/reception unit that refrains from the conventional arrangement of the transmitter and the receiver as well as from the conventional provision of separate reception and transmission optics, and that instead provides a special design of the optics, connecting the reception optic and the transmission optic to each other, which enables an arrangement of the optical transmitter and the optical receiver that allows for a reliable data transfer between two transmission/reception units, regardless of how they are being rotated with respect to each other.

The present invention provides an optical transmission/reception unit, comprising: a carrier rotatable about a rotational axis, an optical receiver arranged at the carrier on the rotational axis so as to receive an optical reception signal out of a first direction, an optical transmitter arranged adjacent to the optical receiver at the carrier so as to emit an optical transmission signal in a second direction, and a transmission/reception optic arranged at the carrier on the rotational axis above the optical receiver and extending across the optical receiver and the optical transmitter, wherein the transmission/reception optic includes a reception optic and a transmission optic arranged in the reception optic, wherein the reception optic is configured to guide the optical reception signal incident on the transmission/reception optic towards the optical receiver on the rotational axis, and wherein the transmission optic is arranged above the optical transmitter and is configured to shape the optical transmission signal emitted by the optical transmitter into an output beam.

The present invention further provides an apparatus for signal transfer, comprising at least one first optical transmission/reception unit according to the present invention, and at least one second optical transmission/reception unit according to the present invention, wherein the first and the second optical transmission/reception unit are arranged in such a way with respect to each other that a transmission beam of a transmission/reception unit illuminates the reception optic of an opposite transmission/reception unit.

One advantage of the inventive transmission/reception unit consists in the fact that a continuous, or uninterrupted, data connection between two such transmission/reception units is ensured, regardless of how the two transmission/reception units are relatively rotated about the optical axis, thereby avoiding the problems of an interruption of the data transfer, as explained in connection with FIG. 1. In other words, the inventive transmission/reception unit ensures that, when used in an apparatus for the optical data transfer between two components rotatable relative to each other, a visual contact between the optical transmitter in one of the components and the optical receiver in the other one of the components is ensured regardless of a relative rotation of the respective components.

This avoids undesired or even safety-critical interruptions of the data transfer. In addition, an increase of the data transfer rate can be achieved via an optical interface.

According to embodiments, the transmission optic is integrated into the reception optic.

According to embodiments, the shape of the transmission optic may be configured as a spherical, aspherical, or even as a free-form surface. According to embodiments, the transmission optic may also be formed by a surface structure provided at one or two surfaces of the reception optic, which, in the case of a spherical curvature of the lens, is not contained in the lens but may be additionally deposited. In the case of aspherical or free-form lens, the surface structure may be contained in the mathematical description of the curvature, or may be later applied via a surface layer.

According to embodiments, wherein the transmission optic is at least partially arranged in the reception optic wherein a portion of the transmission optic facing the optical transmitter forms a first beam-shaping surface for shaping the optical transmission signal, wherein the first beam-shaping surface
   is at least partially formed in a surface of the reception optic facing the optical receiver, or at least partially projects beyond the surface of the reception optic facing the optical receiver or is recessed with respect to the same.

According to embodiments, the transmission optic is at least partially arranged in the reception optic, wherein a portion of the transmission optic facing away from the optical transmitter forms a first beam-shaping surface for shaping the optical transmission signal, wherein the first beam-shaping surface
is at least partially formed in a surface of the reception optic facing away from the optical receiver, or
at least partially projects beyond the surface of the reception optic facing away from the optical receiver or is recessed with respect to the same.

According to embodiments, the transmission optic is at least partially arranged in the reception optic,
wherein a portion of the transmission optic facing the optical transmitter forms a first beam-shaping surface for shaping the optical transmission signal, wherein the first beam-shaping surface
is at least partially formed in a surface of the reception optic facing the optical receiver, or
at least partially projects beyond the surface of the reception optic facing the optical receiver or is recessed with respect to the same, and
wherein a portion of the transmission optic facing away from the optical transmitter forms a second beam-shaping surface for shaping the optical transmission signal, wherein the second beam-shaping surface
is at least partially formed in a surface of the reception optic facing away from the optical receiver, or
at least partially projects beyond the surface of the reception optic facing away from the optical receiver or is recessed with respect to the same.

According to embodiments, the surface of the reception optic facing the optical receiver is divided into two portions by the portion of the transmission optic facing the optical transmitter so that the surface of the reception optic facing away from the optical receiver and the two portions of the surface of the reception optic facing the optical receiver guide the optical reception signal incident on the reception optic towards the optical receiver on the rotational axis.

According to embodiments, the surface facing the optical receiver and/or the surface facing away from the optical receiver, each being of the reception optic, comprise a specified surface structure so that, due to the transmission optic arranged in the reception optic, non-illuminated regions between the reception optic and the carrier are illuminated.

According to embodiments, the surface facing the optical receiver and the surface facing away from the optical receiver, each being of the reception optic, are provided with a layer having a specified surface structure so that, due to the transmission optic arranged in the reception optic, non-illuminated regions between the reception optic and the carrier are illuminated.

According to embodiments, the specified surface structure comprises a predetermined surface roughness or a predetermined repeating structure.

According to embodiments, wherein portions of the reception optic at which a beam-shaping surface is arranged are formed without a surface structure.

According to embodiments, the carrier comprises a carrier surface from which the rotational axis extends perpendicularly.

According to embodiments, the optical receiver and the optical transmitter are arranged on the carrier surface, or wherein the optical receiver and the optical transmitter are arranged at the carrier surface with the same or different distances to the carrier surface.

According to embodiments, the optical transmission/reception unit includes at least one further optical transmitter arranged adjacent to the optical receiver at the carrier, wherein the transmission/reception optic comprises at least one further transmission optic arranged in the reception optic or integrated into the same, wherein the further transmission optic covers a part of the reception optic.

According to embodiments, the optical receiver includes a photo diode, PD, and the optical transmitter includes a laser source such as a laser diode, LD, or an incoherent light source such as a light-emitting diode, LED.

According to embodiments, a wavelength of the optical reception signal and the optical transmission signal is in the ultraviolet range, in the visible range, or in the infrared range.

According to embodiments, the apparatus is configured for a bidirectional transfer in both directions or for a unidirectional transfer in only one direction.

According to embodiments, the rotational axes of the first and second optical transmission/reception units form a mutual axis, or the rotational axes of the first and the second optical transmission/reception units comprise a specified offset.

According to embodiments, the specified offset is between 0 and larger than a radius of the transmission/reception optic.

According to embodiments, the first and second optical transmission/reception units are arranged in a distance to each other which, compared to the size of the transmission/reception units, is small.

According to embodiments, the distance is smaller than a diameter of the transmission/reception units. Embodiments enable an arrangement of transmission/reception units in a very small distance. In other embodiments, the transmission/reception units may be arranged in a larger distance, e.g. in a distance that corresponds to once up to ten times the diameter of the transmission/reception units.

BRIEF DESCRIPTION OF THE DRAWINGS

Embodiments of the present invention will be detailed subsequently referring to the appended drawings, in which:

FIG. 1a-b shows a schematic illustration of a conventional signal transfer apparatus including two optical wireless transmission/reception units, wherein FIG. 1(a) illustrates an orientation of the two optical transmission/reception units with an intact data connection, or an intact data link, between them, and FIG. 1(b) illustrates the two transmission/reception units being rotated with respect to each other so that the data connection is interrupted;

FIG. 3a-g shows different implementations for the transmission/reception optic on the basis of FIG. 3(a) to FIG. 3(g);

FIG. 4a-b shows embodiments for the design of the transmission/reception unit in a top view, wherein FIG. 4(a) illustrates a round, or circular, design of the transmission/reception unit 200, and FIG. 4(b) illustrates a rectangular or square design of the transmission/reception unit 200;

DETAILED DESCRIPTION OF THE INVENTION

Figure 1B:
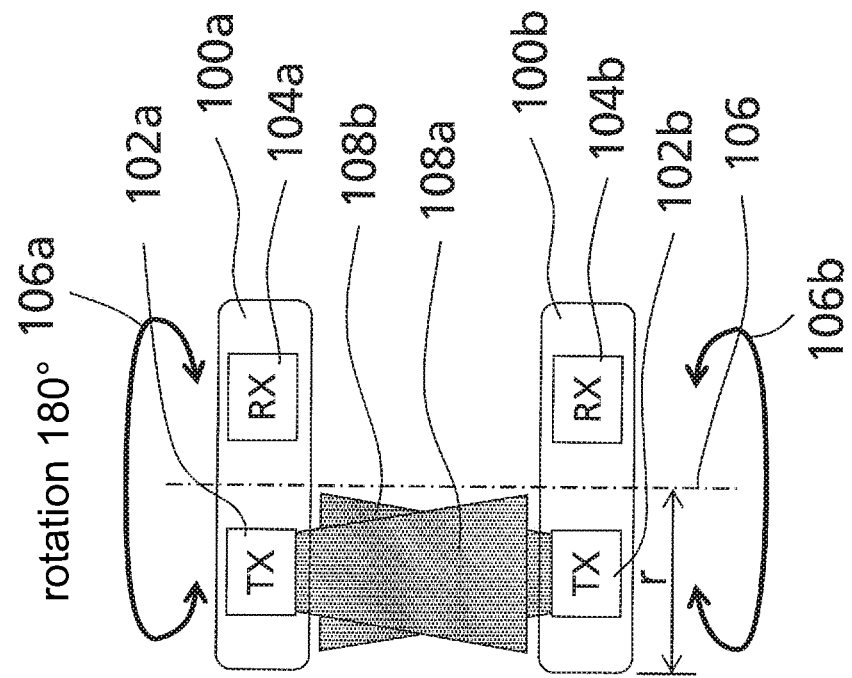
Figure 1A:
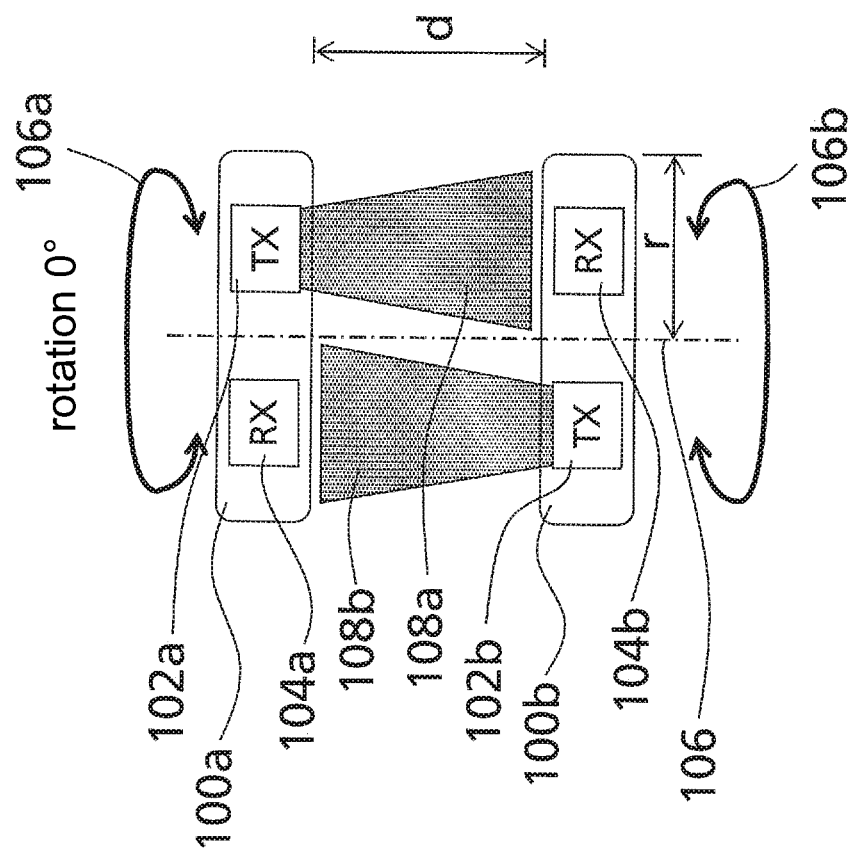

In the subsequent description of the embodiments of the present invention, the same elements or elements having the same effect are provided with the same reference numerals in the drawings.

Figure 2:
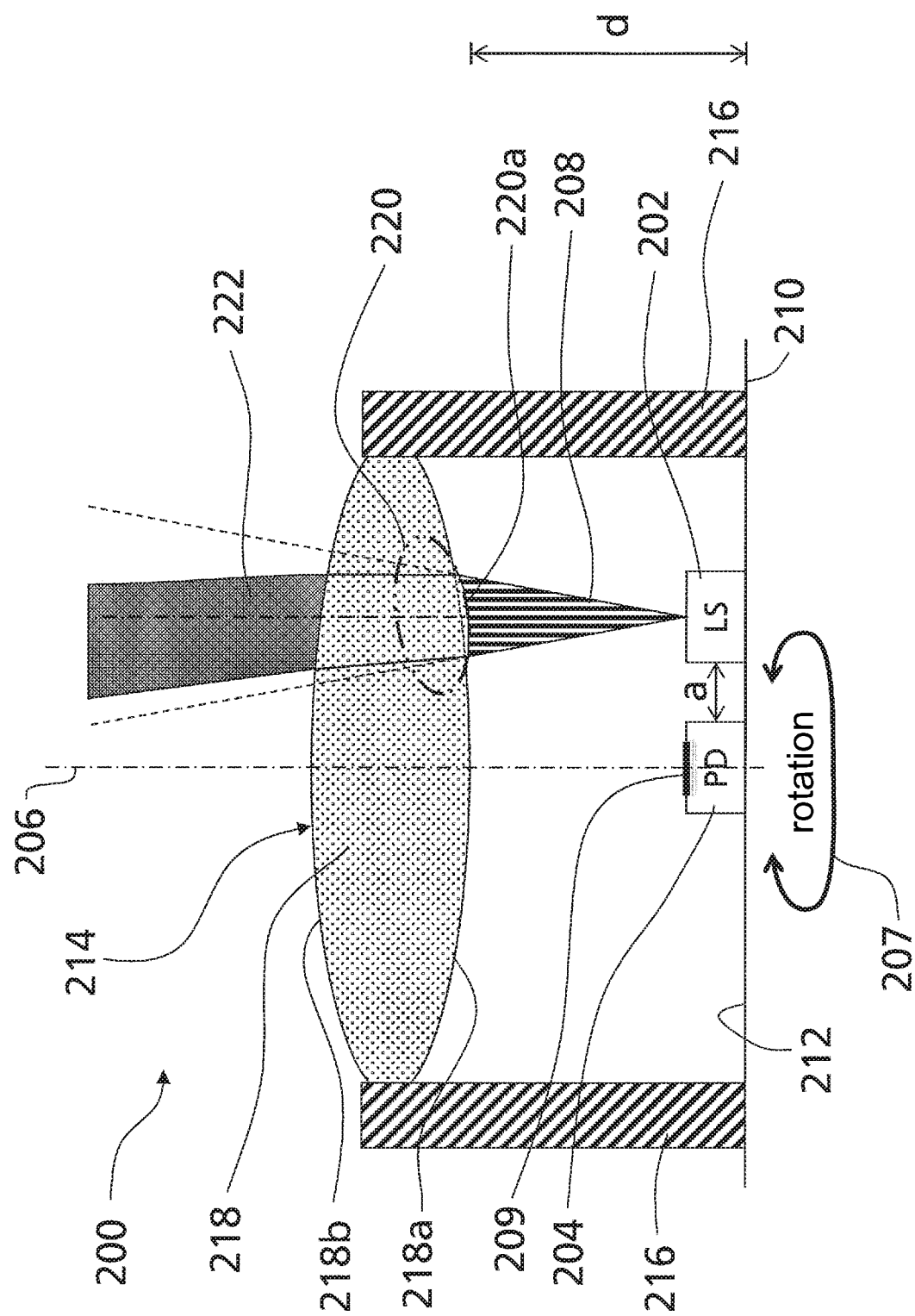
FIG. 2 shows the structure of a transmission/reception unit according to an embodiment of the present invention.

FIG. 2 shows the structure of a transmission/reception unit according to an embodiment of the present invention. The transmission/reception unit 200 includes an optical transmitter 202 and an optical receiver 204. The transmission/reception unit 200 is arranged to be rotatable about the rotational axis 206, as is indicated by the arrow 207. In addition, FIG. 2 illustrates the transmission beam 208 provided by the optical transmitter 202. The optical receiver 204 is arranged such that its position coincides with a position of the rotational axis 206. The optical receiver 204 receives an optical reception signal out of a first direction, and the optical transmitter 202 transmits an optical transmission signal into a second direction essentially opposite to the first direction. In the illustrated embodiment, the optical receiver 204, which may exemplarily be formed by a photodiode, PD, includes an active surface 209 so as to receive incident light. The receiver 204 is arranged in the region of the rotational axis 206 such that the rotational axis 206 stands centrally on the active surface 209 and is perpendicular to the same. In the illustrated embodiment, the transmission/reception unit, or the transceiver 200, further includes a carrier 210, and, in the illustrated embodiment, the optical transmitter 202 and the optical receiver 204 are arranged on a surface 212 of the carrier. The optical transmitter 202 is arranged to be offset to the rotational axis 206 and spaced apart from the optical receiver 204. In other words, the optical receiver 204 is arranged in the center of the carrier 210 with respect to the rotational axis 206, and the optical transmitter 206 is arranged off-center, or eccentrically, with respect to the rotational axis 206 on the carrier 210. According to embodiments, the distance a between the optical receiver 204 and the optical transmitter 202 may depend on the system design.

The transmission/reception unit 200 further includes a transmission/reception optic 214 arranged spaced apart from the carrier surface 212 and therefore spaced apart from the optical transmitter 202 and optical receiver 204. The transmission/reception unit 200 includes a carrier structure 216 for fixing/mounting the transmission/reception optic 214. The carrier structure 216 is arranged on the carrier surface 212 of the carrier 210 and extends, as is illustrated in FIG. 2, upwardly so that the transmission/reception optic is arranged spaced apart from the carrier surface 212. According to an embodiment, the transmission/reception optic is arranged in a distance d to the surface 212 of the carrier 210, which may be in the range of the radius of the optic 214 to the diameter of the optic 214. As is illustrated in FIG. 2, the distanced is measured along the rotational axis 208 from the carrier surface 212 to the optic 214.

According to the invention, the transmission/reception optic 214 includes a reception optic 218 and a transmission optic 220, wherein the transmission optic 220 is arranged in the reception optic 218, as is illustrated in FIG. 2. In other words, the transmission/reception optic is primarily formed by the reception optic 218 arranged on the rotational axis 206 and extending across the optical receiver 204 and the optical transmitter 202, wherein the transmission optic 220 is arranged in the region above the optical transmitter 202. For example, the transmission optic 220 may be integrated into the reception optic 218. In the embodiment illustrated in FIG. 2, the transmission optic 220 is integrated into the reception optic 218 such that a transmission beam-shaping surface 220a facing the optical transmitter 202 extends beyond a first surface 218a of the reception optic 218 facing the optical receiver 204. The transmission optic 220 is integrated into the reception optic 218 such that, with the exception of the beam-shaping surface 220a, the remaining portions of the transmission optic 220 are arranged within the reception optic 218, i.e. not extending beyond a second surface 218b of the reception optic 218 facing the optical receiver 204.

Thus, according to the invention, the reception optic 218 and the transmission optic 220 are to be integrated in such a way with each other that a mutual or single transmission/reception optic or transceiver optic 214 is created, wherein the reception optic 218 forms the largest part of the transmission/reception optic 214. As will subsequently be explained in more detail, the inventive design of the transmission/reception unit enables provision of a data transfer apparatus for the data transfer from relatively rotatable components with an ability for a rotation of 360°, even with very short distances. This ensures a reliable and continuous data transfer, avoiding the problems arising with conventional designs of transmission/reception units, as explained above. According to the invention, the electrical receiver element, or the optical receiver 204, e.g. including a photodiode, sits on the rotational axis 206, and the reception optic 218 also sits on the rotational axis 206 above the photodiode 204, as is illustrated in FIG. 2. The light source, or the optical transmitter 202, is located off-center, i.e. spaced apart from the rotational axis 206, adjacent to the photodiode 204, i.e. in the immediate vicinity of the same. The optical transmitter 202 may include a laser source such as a laser diode, LD, or an incoherent light source such as a light emitting diode, LED.

The light signals processed by the transmission/reception unit may have wavelengths in the ultraviolet range, in the visible range, or in the infrared range.

As is illustrated in FIG. 2, the transmission optic 220 sits above the light source 202 and shapes the transmission beam 208 in order to obtain, or to shape, an output beam 222 directed into a predetermined direction, e.g. onto an opposite transceiver in a signal transfer apparatus, as will be explained in the following. The transmission optic 220 is arranged such that it covers the reception optic 218 at the position at which the transmission optic 220 is arranged, wherein, in the embodiment illustrated in FIG. 2, only the part 220a of the transmission optic 220 extending beyond the circuit 218a of the reception optic 218 is used for beam shaping.

However, the present invention is not limited to the design of the transmission/reception optic 214 according to the embodiment illustrated in FIG. 2, rather, the transmission/ reception optic may also be designed differently. FIG. 3(a) to FIG. 3(g) show different implementations for the transmission/reception optic 214.

FIG. 3(a) shows the design of the transmission/reception optic 214, as explained on the basis of FIG. 2, according to which the transmission optic 220 is integrated in such a way into the reception optic 218 that only the beam-shaping surface 220a of the reception optic 220 extends beyond the lower surface of the reception optic 218 and is available to beam-shape the transmission beam 208 so as to generate the output beam 222.

According to FIG. 3(b), in other embodiments, the transmission optic 220 may be integrated in such a way into the reception optic 218 that a beam-shaping surface 220b of the transmission optic 220 extends beyond the second surface 218b of the reception optic and is available to beam-shape the transmission beam 208 so as to generate the output beam 222. In the embodiments illustrated in FIG. 3(a) and FIG. 3(b), the first and second surfaces 218a, 218b, respectively, of the reception optic 218 are divided by the projecting beam-shaping surface 220a, 220b of the transmission optic 220.

According to a further embodiment, illustrated on the basis of FIG. 3(c), both surfaces 218a, 218b of the reception optic 218 may be divided by the transmission optic 220, which, in the illustrated embodiment, is integrated in such a way into the reception optic 218 that a first beam-shaping surface 220a facing the optical transmitter 202 projects beyond the first surface 218a of the reception optic 218, and a second beam-shaping surface 220b facing away from the optical transmitter 202 and extending beyond the second surface 218b of the reception optic 218.

According to the embodiments shown in FIGS. 3(a) to 3(c), one or several beam-shaping surfaces of the transmission optic extend beyond surfaces of the reception optic. In other embodiments, one or several beam-shaping surfaces of the transmission optic are recessed, or subtracted, with respect to surfaces of the reception optic.

In the embodiment shown in FIG. 3(e), the beam-shaping surface 220a of the transmission optic 220 is recessed with respect to the surface 218a. In the embodiment shown in FIG. 3(f), the beam-shaping surface 220b of the transmission optic 220 is recessed with respect to the surface 218b. In the embodiment shown in FIG. 3(g), the beam-shaping surface 220a of the transmission optic 220 is recessed with respect to the surface 218a, and the beam-shaping surface 220b of the transmission optic 220 is recessed with respect to the surface 218b.

According to again further embodiments, it is not necessary for the beam-shaping surfaces 220a, 220b of the transmission optic 220 to extend beyond, or to be recessed with respect to, the corresponding surfaces 218a, 218b of the reception optic 218, rather, the beam-shaping surfaces 220a, 220b, which may also be referred to as lower and upper active transmission surfaces, respectively, may be contained in the surfaces 218a, 218b, as is illustrated on the basis of FIG. 3(d).

According to the invention, at least one of the beam-shaping surfaces, or also both beam-shaping surfaces according to embodiments, of the transmission optic 220 is there to beam-shape the transmission beam, wherein, with in light of FIG. 3(d), it is to be noted that the beam-shaping surface 220b may also be contained in the surface 218b of the reception optic 218.

In a top view, the transmission/reception unit 200 illustrated in FIG. 2 may have different shapes. FIG. 4 shows two embodiments for the design of the transmission/reception unit in a top view, wherein FIG. 4(a) illustrates a round, or circular, design of the transmission/reception unit 200, and FIG. 4(b) illustrates a rectangular, or square, design of the transmission/reception unit 200. To a person skilled in the art, it is obvious that the transmission/reception unit 200 may have any shape, e.g. a polygonal shape.

FIG. 4(a) shows a circular transmission/reception unit 200 having a radius r measured from the rotational axis 206 to the circularly designed holder 216 for the transmission/reception optic 214, which is not illustrated. FIG. 4(a) further indicates another embodiment, according to which one or several additional optical transmitters 202', 202" may be provided in the same or different distance to the optical reception means 204. In the embodiment illustrated in FIG. 4(a), the holder 216 is illustrated to be circumferential, however, it may also be configured by single supports or the like for holding the transmission/reception optic 214.

According to embodiments, if one or several additional optical transmitters 202', 202" are provided, the transmission/reception optic 214 designed according to the invention includes additional transmission optics 220 with additional beam-shaping surfaces 220a' integrated into the reception optic 218, as is exemplarily illustrated in FIG. 3(a). The additional transmission optic 220' is arranged above the optical transmitter 220' and provides a beam-shaping surface 220a' for beam shaping the transmission beam provided by the additional optical transmission unit 202'. According to other embodiments, the additional transmission optic 220' may be designed similarly to the transmission optic 220, i.e. in the form of the embodiments illustrated in FIG. 3(b) to FIG. 3(d).

FIG. 4(b) shows a rectangular design of the transmission/reception unit 200, wherein the distance from the rotational axis 206 to the edge of the unit 200 is referred to as the radius r. In this embodiment, the holder 216 for carrying the transmission/reception optic 214 includes four supports 216a to 216d arranged at the corners, which obviously may be arranged differently in other embodiments.

Figure 5A:
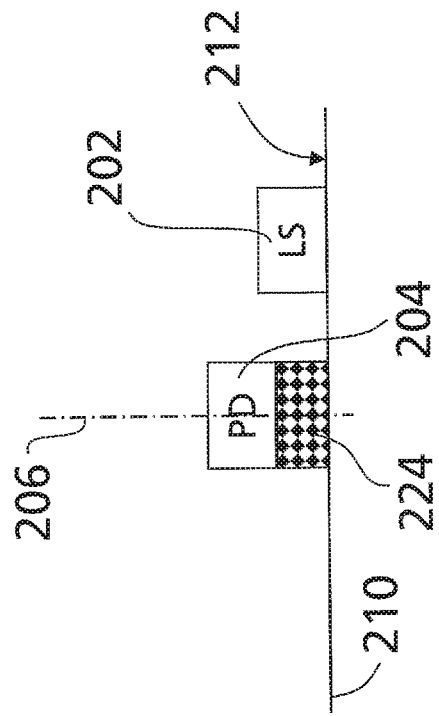
FIG. 5a-b shows different implementations for the arrangement of the optical transmitter/receiver on a carrier of the transmission/reception optic based on FIG. 5(a) and FIG. 5(b)
Figure 5B:
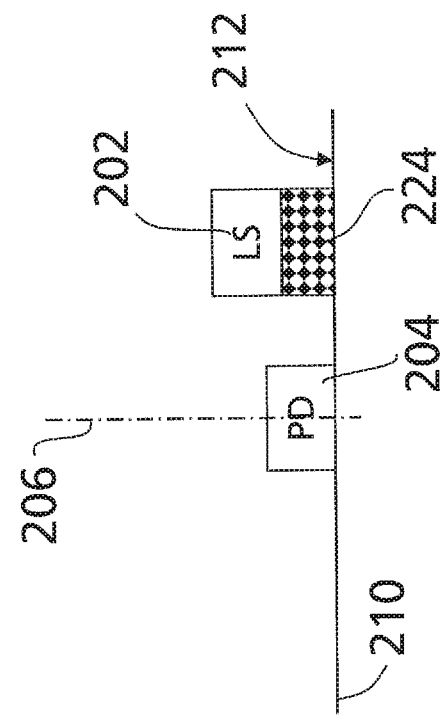

In the embodiment illustrated on the basis of FIG. 2, the optical transmitter 202 and the optical receiver 204 are both arranged on the surface 212 of the carrier 210. However, the present application is not limited to such an arrangement, rather, the elements 202, 204 may be arranged in the same or different distances to the surface 212. FIG. 5 shows possible implementations for such a design, wherein FIG. 5(a) illustrates a design in which the optical transmitter 202 is arranged spaced apart from the carrier surface 212 by means of an appropriate spacer element 224, whereas the optical receiver 204 is located on the carrier surface 212. FIG. 5(b) shows another embodiment in which the optical receiver 204 is arranged spaced apart from the surface 212 of the carrier 210 using an appropriate spacer 224, whereas the optical transmitter 202 is arranged on the surface 212. In again different embodiments, as mentioned, both the optical transmitter 202 and the optical receiver 204 may be arranged spaced apart from the surface of the carrier with an appropriate spacer 224, wherein the distances for the optical transmitter and for the optical receiver may be the same or different.

Figure 6:
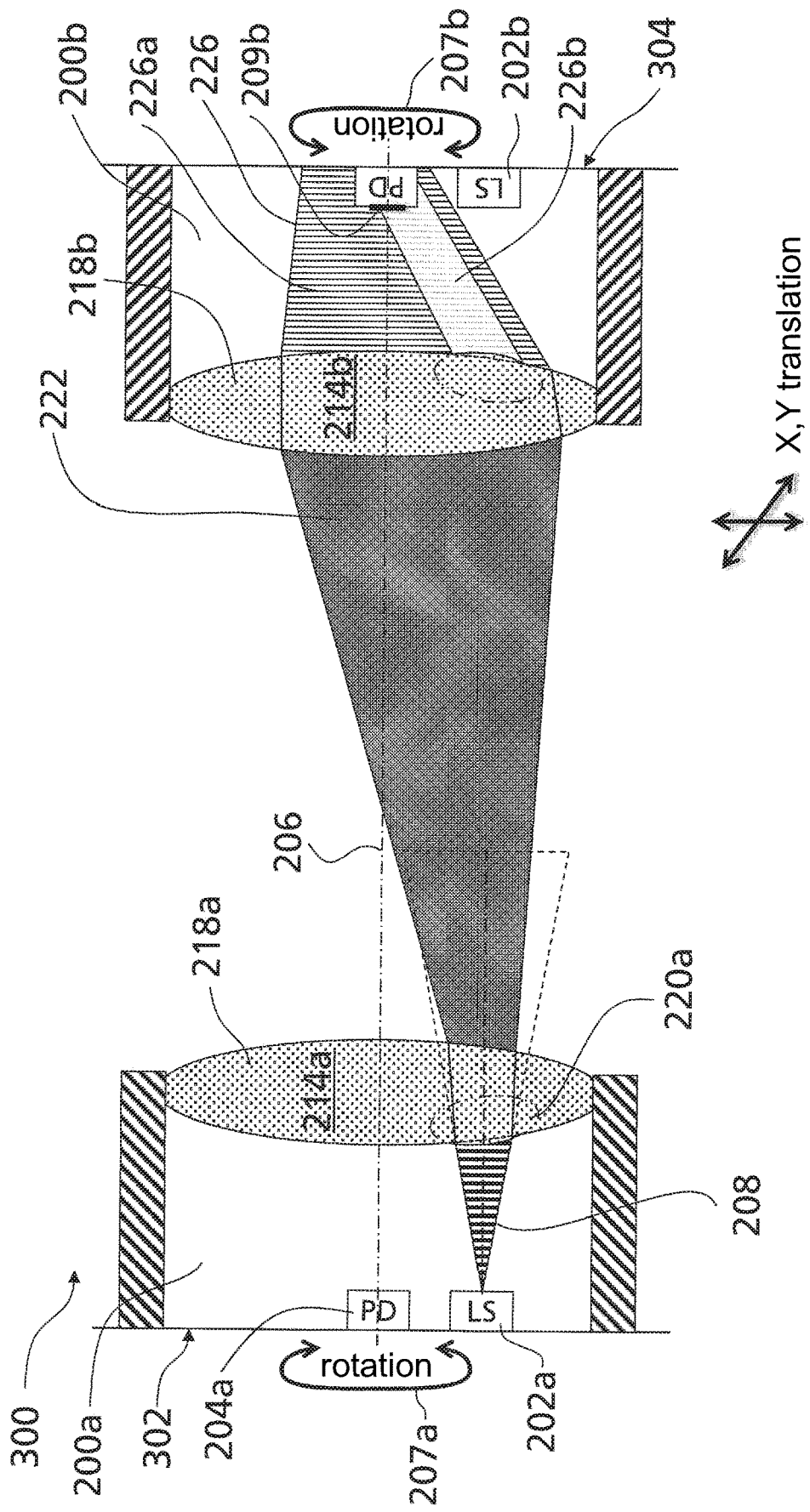
FIG. 6 shows an embodiment for a signal transfer means comprising two components arranged to be rotatable relative to each other, each being provided with a transmission/reception unit implemented according to the invention.

Embodiments for a signal transfer means using the inventive transmission/reception units, as exemplarily explained on the basis of FIGS. 2 to 5, are subsequently described in more detail. FIG. 6 shows an embodiment for a signal transfer means 300 comprising two components 302, 304 arranged to be rotatable with respect to each other, each being provided with a transmission/reception unit 200a and 200b, respectively, according to the invention, so as to enable a wireless optical data transfer between the two components 302, 304 arranged to be rotatable with respect to each other. FIG. 6 illustrates the elements of the transmission/reception unit 200a described on the basis of FIG. 2, and the reference numerals are provided with the addition "a" and are not described again. Also, the transmission/reception unit 200b associated with the second component 304 is illustrated, and the corresponding components described on the basis of FIG. 2 are provided with the same reference numerals with the addition "b" and are also not described again.

FIG. 6 exemplarily shows a data transfer from the first component 302 to the second component 304, i.e. a unidirectional connection, or a unidirectional link, wherein, according to other embodiments, a simultaneous transfer in both directions is also possible. As is illustrated in FIG. 6, the transmission optic 220a of the transmitting transmission/reception unit 200a is configured to shape the transmission beam 208 into the output beam 222 such that the output beam 222 is directed onto the transmission/reception optic 214b of the receiving transmission/reception unit 200b, or illuminates this transmission/reception optic. According to embodiments, the receiving transmission/reception unit 200b, which may also be referred to as reception transceiver, may be displaced from the optical Z axis coinciding with the rotational axis 206 in the X direction and/or Y direction, wherein the degree of displacement depends on the exact design of the transmission/reception optic. According to embodiments, the offset may be between 0 and larger than a radius of the transmission/reception optic.

The transmission beam 222 provided by the transmission transceiver, or by the transmission/reception unit 200a, and directed to the reception optic 218b is collected by the transceiver optic 214b of the reception transceiver 200b and is guided towards the photodiode 204b by the first and second reception surfaces. FIG. 6 shows the reception beam 226 generated by the transmission/reception optic 214b and, in the embodiment shown in FIG. 6, comprising, due to the arrangement of the transmission optic 220b within the reception optic 218b, a first portion 226a at least partially incident onto the active surface 209b of the photodiode 204b, and further comprising an omitted, or non-illuminated, region 226b created through the arrangement/integration of the transmission optic 220 within the reception optic. In other words, the light spot imaged onto the photodiode plane by the reception optic 218 comprises the gap 226b at the location of the transmission optic, or the transmission lens, which is uncritical in situations in which this gap is outside of the region of the active surface 209 of the photo diode 204 so that the gap does not affect data transfer.

Figure 7:
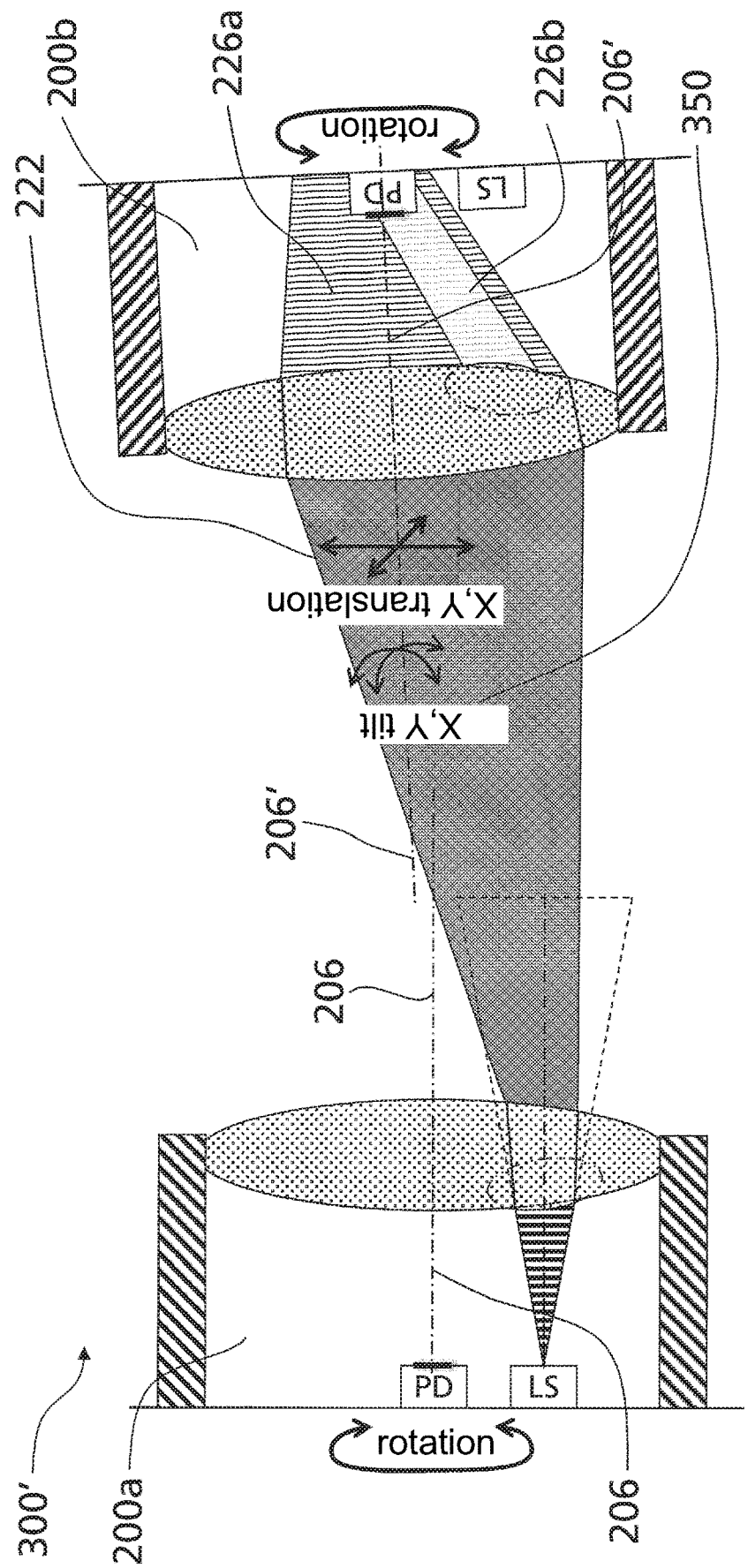
FIG. 7 shows an embodiment similar to FIG. 6, wherein the transmission/reception units are arranged with an offset and a tilt with respect to each other.

FIG. 6 illustrates an arrangement of the two transmission/reception units 200a and 200b which is such that both units are located on the same optical axis, i.e. the mutual optical axis illustrated in FIG. 6 or the mutual rotational axis 206. However, the present invention is not limited to such designs. Each transceiver has its own rotational axis. These rotational axes (cf. FIG. 6) may be identical, however, which they are typically not. Both rotational axes may, to a certain extent, be displaced or tilted with respect to each other so that, according to further embodiments, the transmission/reception units 200a, 200b are offset with respect to each other so that they do not comprise a mutual optical axis, or mutual rotational axis. FIG. 7 shows a design similar to that of FIG. 6, wherein the same elements are provided with the same reference numerals and are not described again. In the embodiment shown in FIG. 7, the transmission/reception units 200a, 200b are arranged with a relative offset, as is indicated by the reference numeral 350, e.g. the second transmission/reception unit 200b is arranged tilted in the X and Y directions, so that the optical axes, or rotational axes, 206, 206' of the two units no longer coincide, and comprise a corresponding offset. The optical axis, or rotational axis, 206 of the first transmission/reception unit 200a is offset with respect to the optical axis, or rotational axis, 206' of the second transmission/reception unit 200b, as can be seen in FIG. 7.

Depending on the relative arrangement of the elements, e.g. depending on a tilt or an offset, there may be situations in which the non-illuminated portion 226b moves into the region of the active surface of the photodiode, which would lead to an interruption of the data connection. In order to avoid such a situation, according to embodiments, an additional surface structure may be provided, as is subsequently explained on the basis of FIG. 8.

Figure 8:
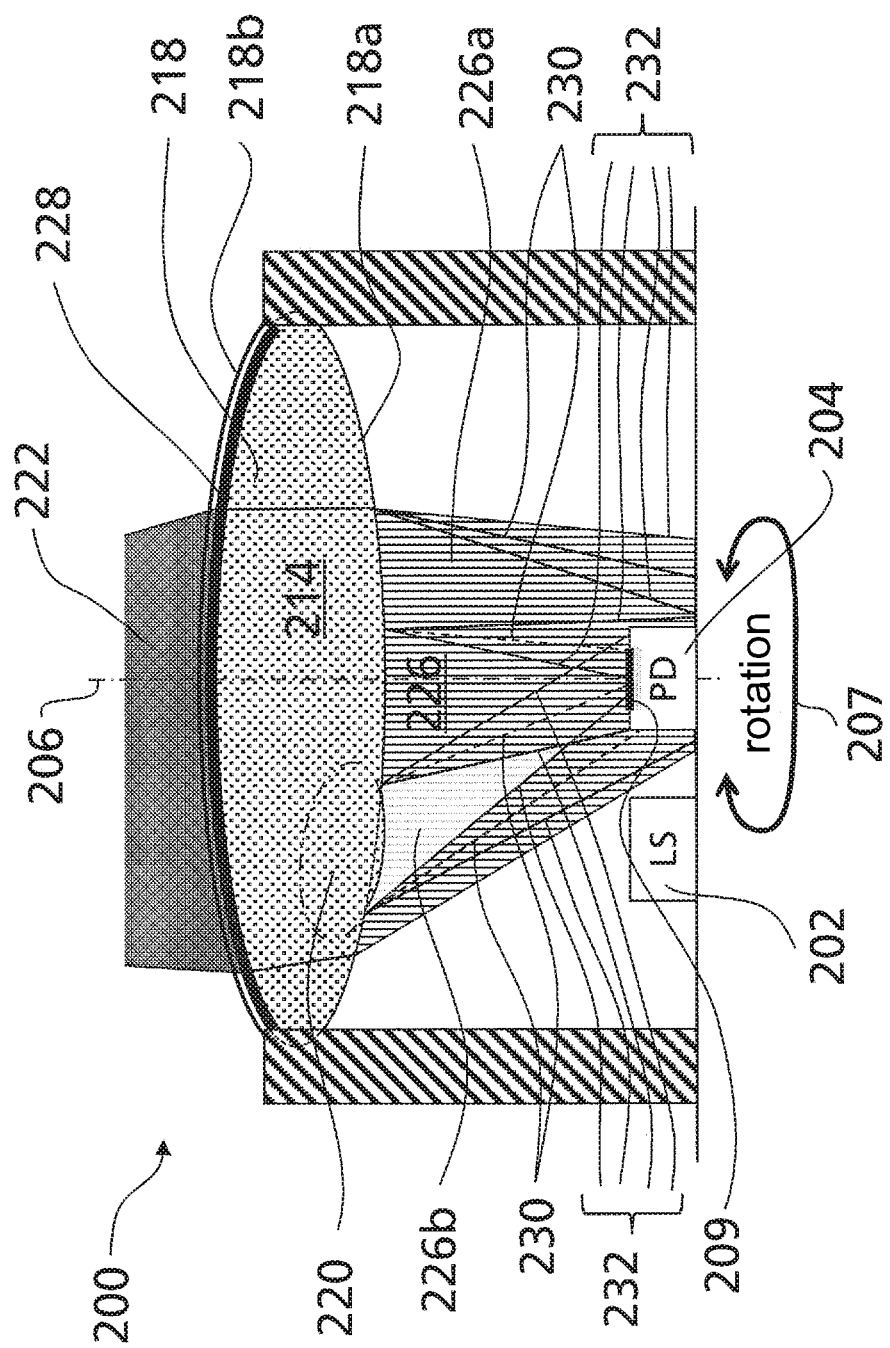
FIG. 8 shows an embodiment of the transmission/reception unit according to the invention, wherein the transmission/reception optic comprises a surface structure at a surface.

According to embodiments, the above-mentioned gap 226b may be avoided, or closed, in order to therefore avoid an interruption of a data transfer in situations in which, e.g. due to a rotation or an offset (FIG. 7) of the components 302, 304, the gap is located in the region of the active surface of the photo diode. According to embodiments, in order to avoid, or to close, said gap, the transmission/reception optic may be provided with a predetermined surface structure, e.g. to selectively vary the ideal beam imaging so that the focused beams may also be selectively guided to the positions in the gap. This smooths out the illumination by the reception beam and closes the possible transfer gap. Simultaneously, any other advantageous illumination may be provided by means of the surface structure. FIG. 8 shows an embodiment of the transmission/reception unit 200 according to the invention, wherein the transmission/reception optic 214 comprises at the second surface, i.e. the surface 218b facing away from the receiver, the above-mentioned surface structure, which is schematically indicated with the reference numeral 228 in FIG. 8. According to further embodiments, the structure 228 may be arranged on the surface 218a facing the receiver, and, according to further embodiments, the structure 228 is provided at both surfaces 218a, 218b. It is to be noted that the structure 228 is arranged on the surfaces 218a, 218b in such a way that the region in which the transmission optic 220 is formed, or the regions of the beam-shaping surfaces 220a, 220b of the transmission optic 220, is not provided with the surface structure 228. According to embodiments, the structure 228 is either provided by processing the corresponding surfaces 218a and 218b, or the transmission/reception optic is provided or coated with an additional layer on the surfaces 218a, 218b, providing the corresponding surface structure, wherein the coating is such that, as mentioned, regions of the transmission optic defining the beam-shaping surface 220a, 220b are omitted.

In FIG. 8, reference numeral 230 is used to schematically illustrate the ideal beam imaging, as achieved without the surface structure 228. The surface structure accounts for the varied beams indicated by the reference numeral 232, so that the non-illuminated region 226b of the reception beam 226 is reduced, and, in particular, so that the gap 226b is closed in the region of the optical receiver 214, or in the region of the active surface 209 of the same.

According to embodiments, the surface structure 228 includes a design of the surfaces of the optic 214 with a predetermined surface roughness, or the layer applied onto the optic 214 is provided with such a surface roughness. According to other embodiments, instead of a specified surface roughness, the applied layer, or the surfaces of the optic 214, may be structured, resulting in predetermined repeating structures that lead to a variation of the beams in the above-described manner.

In contrast to the conventional technology, the distance of the transmission/reception units 200a, 200b arranged in an apparatus according to FIGS. 6 and 7 may be kept small, e.g. smaller than the diameter of the transmission/reception units, since, due to the inventive design of the transmission/reception units, even with a small distance and a relative rotation of the transmission/reception units 200a, 200b, the transmission beam 222 provided by the transmitting unit is incident on the reception optic of the receiving unit that guides the incident light onto the photodiode, so that, even with a small distance and a rotation, a reliable data transfer, or data connection, is ensured.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Optical rotatable transmission/reception unit, comprising:
   a carrier rotatable about a rotational axis,
   an optical receiver arranged at the carrier on the rotational axis so as to receive an optical reception signal out of a first direction,
   an optical transmitter arranged adjacent to the optical receiver at the carrier so as to emit an optical transmission signal in a second direction, and
   a transmission/reception optic arranged at the carrier on the rotational axis above the optical receiver and extending across the optical receiver and the optical transmitter, wherein the transmission/reception optic comprises a reception optic and a transmission optic arranged in the reception optic,
   wherein the reception optic is configured to guide the optical reception signal incident on the transmission/reception optic towards the optical receiver on the rotational axis,
   wherein the transmission optic is arranged above the optical transmitter and is configured to shape the optical transmission signal emitted by the optical transmitter into an output beam,
   wherein the reception optic is a reception lens extending across the optical receiver and the optical transmitter, and the transmission optic is formed by a surface structure provided at one or two surfaces of the reception lens,
   wherein the transmission optic is at least partially arranged in the reception optic, wherein a portion of the transmission optic facing the optical transmitter forms a first beam-shaping surface for shaping the optical transmission signal, and wherein the first beam-shaping surface:
      is at least partially formed in a surface of the reception optic facing the optical receiver, or
      at least partially projects beyond the surface of the reception optic facing the optical receiver or is recessed with respect to the same, and
   wherein the surface of the reception optic facing the optical receiver is divided into two portions by the portion of the transmission optic facing the optical transmitter so that a surface of the reception optic facing away from the optical receiver and the two portions of the surface of the reception optic facing the optical receiver guide the optical reception signal incident on the reception optic towards the optical receiver on the rotational axis.

2. Optical rotatable transmission/reception unit according to claim 1,
   wherein a portion of the transmission optic facing away from the optical transmitter forms a second beam-shaping surface for shaping the optical transmission signal, and wherein the second beam-shaping surface:
      is at least partially formed in a surface of the reception optic facing away from the optical receiver, or
      at least partially projects beyond the surface of the reception optic facing away from the optical receiver or is recessed with respect to the same.

3. Optical rotatable transmission/reception unit according to claim 1, wherein a surface facing the optical receiver and/or a surface facing away from the optical receiver, each being of the reception optic, comprise a specified surface structure so that, due to the transmission optic being formed by a part of the reception optic, non-illuminated regions between the reception optic and the carrier are illuminated.

4. Optical rotatable transmission/reception unit according to claim 3, wherein the specified surface structure comprises a predetermined surface roughness or a predetermined repeating structure.

5. Optical rotatable transmission/reception unit according to claim 1, wherein a surface facing the optical receiver and a surface facing away from the optical receiver, each being of the reception optic, are provided with a layer comprising a specified surface structure so that, due to the transmission optic arranged in the reception optic, non-illuminated regions between the reception optic and the carrier are illuminated.

6. Optical rotatable transmission/reception unit according to claim 1,
   wherein portions of the reception optic at which a beam-shaping surface is arranged are formed without a surface structure.

7. Optical rotatable transmission/reception unit according to claim 1, wherein the carrier comprises a carrier surface from which the rotational axis extends perpendicularly.

8. Optical rotatable transmission/reception unit according to claim 7, wherein the optical receiver and the optical transmitter are arranged on the carrier surface, or wherein the optical receiver and the optical transmitter are arranged at the carrier surface with the same or different distances to the carrier surface.

9. Optical rotatable transmission/reception unit according to claim 1, comprising at least one further optical transmitter arranged adjacent to the optical receiver at the carrier, wherein the transmission/reception optic comprises at least one further transmission optic arranged in the reception optic or integrated into the same, wherein the further transmission optic covers a part of the reception optic.

10. Optical rotatable transmission/reception unit according to claim 1, wherein the optical receiver comprises a photo diode, PD, and wherein the optical transmitter comprises a laser diode, LD, or a light emitting diode, LED.

11. Optical rotatable transmission/reception unit according to claim 1, wherein a wavelength of the optical reception signal and the optical transmission signal is in an ultraviolet range, in a visible range, or in an infrared range.

12. Apparatus for signal transfer, comprising at least one first optical rotatable transmission/reception unit according to claim 1; and at least one second optical rotatable transmission/reception unit according to claim 1;

wherein the first and the second optical rotatable transmission/reception units are arranged in such a way with respect to each other that a transmission beam of a transmission/reception unit illuminates the reception optic of an opposite transmission/reception unit.

13. Apparatus according to claim 12, configured for a bidirectional transfer in both directions or for a unidirectional transfer in only one direction.

14. Apparatus according to claim 12, wherein the rotational axes of the first and second optical rotatable transmission/reception units form a mutual axis, or wherein the rotational axes of the first and the second optical rotatable transmission/reception units comprise a specified offset.

15. Apparatus according to claim 14, wherein the specified offset is between 0 and larger than a radius of the transmission/reception optic.

16. Apparatus according to claim 12, wherein the first and second optical rotatable transmission/reception units are arranged in a distance to each other which, compared to the size of the transmission/reception units, is small.

17. Apparatus according to claim 16, wherein the distance is smaller than a diameter of the transmission/reception units.

* * * * *